May 23, 1961 J. L. TALBOT 2,985,694
MULTISTAGE XYLENE SEPARATION PROCESS
Filed March 12, 1958
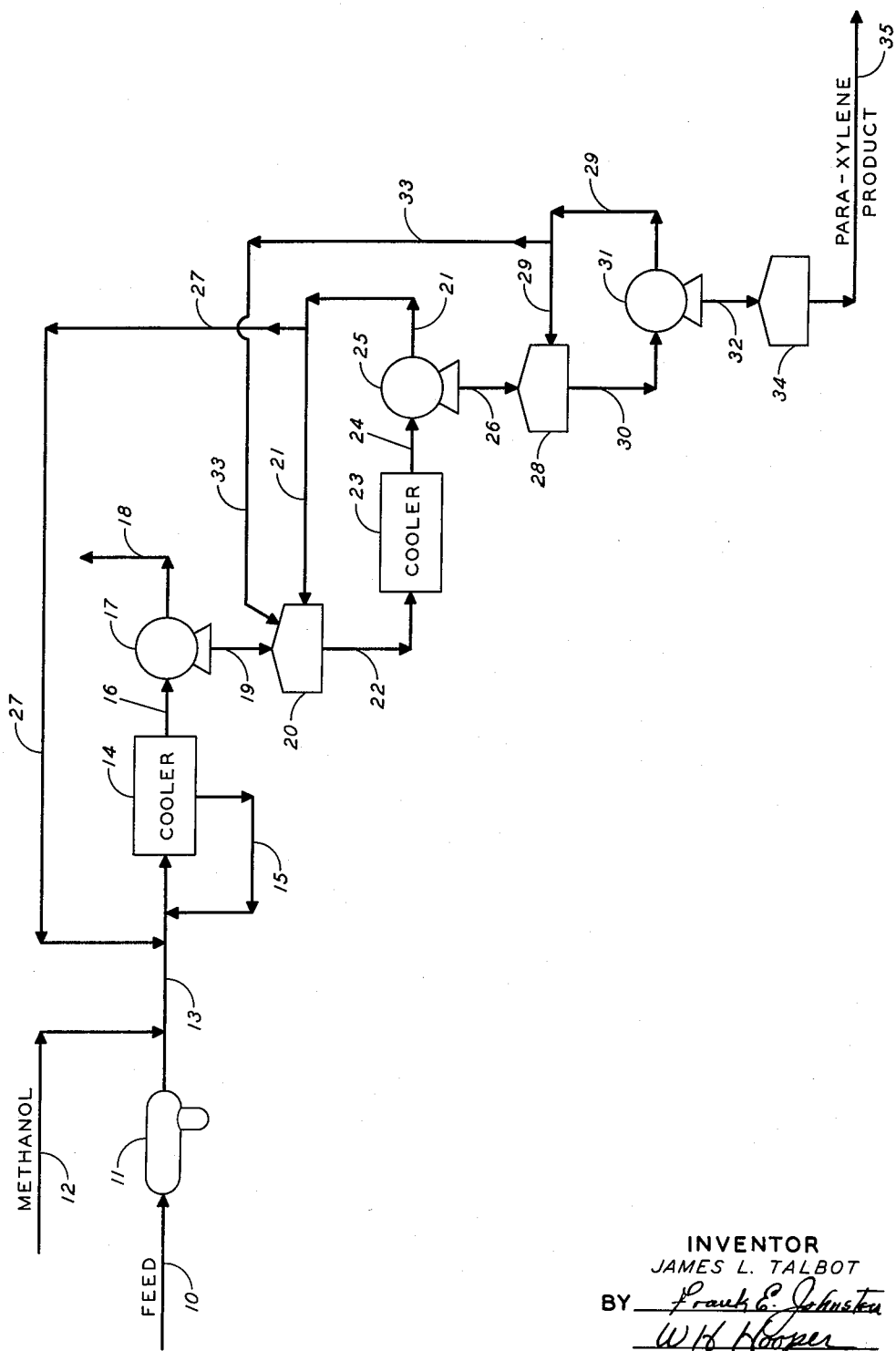
INVENTOR
JAMES L. TALBOT
BY
ATTORNEYS

United States Patent Office 2,985,694
Patented May 23, 1961

2,985,694

MULTISTAGE XYLENE SEPARATION PROCESS

James L. Talbot, Novato, Calif., assignor to California Research Corporation, San Francisco, Calif., a corporation of Delaware Filed Mar. 12, 1958, Ser. No. 720,955

3 Claims. (Cl. 260—674)

This invention relates to a fractional crystallization process for the separation of paraxylene from hydrocarbon mixtures comprising paraxylene and at least one other isomeric xylene.

Large quantities of hydrocarbon mixtures consisting predominantly of xylene isomers are produced commercially. Narrow distillation cuts having high contents of the xylene isomers have been separated from coke oven distillates and catalytically reformed naphtha. The desirability of separating the individual xylene isomers from these xylene-rich mixtures has long been evident to industrial chemists.

At the present time, there exists a large commercial market for high purity paraxylene. A large portion of this market involves the conversion of paraxylene to dimethyl terephthalate which, in turn, is used to prepare polyethylene terephthalate polymers useful as synthetic fibers and films. Additionally, paraxylene can be oxidized to terephthalic acid which can be converted, by esterification with methanol, to dimethyl terephthalate. It is apparent that in such conversions the higher the purity of the paraxylene starting material, the higher the purity of the dimethyl terephthalate or terephthalic acid made therefrom. Accordingly, it would be extremely desirable to have recourse to a process for recovering paraxylene from xylene-containing feed stocks wherein high yields of paraxylene, having a purity in excess of 95% and preferably above 98%, can be attained. Such a process is disclosed herein.

According to the present process, a hydrocarbon fraction comprising paraxylene and at least one other xylene isomer is cooled to a temperature in the range of from about −75° F. to −120° F. for a time sufficient to cause the formation of a first slurry comprising a first solid crystal phase and a first liquid phase. These phases are then separated in a primary separation zone and the predominantly paraxylene first solid crystal phase recovered therefrom is admixed with a recycle stream to cause the formation of a second slurry. The resulting second slurry is passed into the first of n intermediate separation zones, wherein n is an integer from 1 to 10. From each intermediate separation zone is sequentially recovered an increasingly rich paraxylene solid crystal phase and a liquid phase. At least a portion of each liquid phase recovered from each intermediate separation zone is passed as a recycle stream to contact the solid crystal phase recovered from the separation zone immediately upstream of the intermediate separation zone from which each liquid phase is separated. The solid crystal phase recovered from all but the last intermediate separation zone, along with the recycle stream, is passed as a slurry feed to the next succeeding intermediate separation zone. The temperature of the slurry feed to each intermediate separation zone, including said second slurry, is adjusted such that the solid crystal phase recovered from each intermediate separation zone has a concentration of components other than paraxylene of from 50 to 98% less than the concentration of said components present in the solid crystal phase recovered from the preceding separation zone. The solid crystal phase recovered from the last intermediate separation zone is contacted with a final recycle stream to cause the formation of a final slurry whose temperature is adjusted within the range of from about 0° F. to 55° F. This final slurry is thereafter separated in a terminal separation zone to recover a final solid crystal phase product having a paraxylene purity in excess of 95% and a final liquid phase. At least a portion of the final liquid phase is passed as said final recycle stream to contact the solid crystal phase recovered from the last intermediate separation zone.

In the process described above, the temperature of the xylene-containing feed stock immediately prior to and during separation in the primary separation zone determines the paraxylene yield. For a maximum yield, the feed should be slowly cooled to a temperature just above the eutectic temperature of the xylenes present in the feed. At this temperature, maximum crystallization of paraxylene occurs with essentially no crystallization of any other xylene isomers, such as metaxylene. The desired temperature lies in the range of from about −75° F. to −120° F., depending on the proportions of the various xylenes present in the feed. At relatively high temperatures, for example, on the order of from about −20° F. to −40° F., only a comparatively small portion of the paraxylene present in the feed will crystallize, thereby obviously reducing the total yield of paraxylene. At temperatures lower than the noted range, that is, at temperatures below the eutectic point of paraxylene and metaxylene, metaxylene crystals will form within the paraxylene crystalline phase, a result obviously to be avoided.

Crude paraxylene produced by the operation just described is not of adequate purity for commerical use. It must be recognized that the crystals themselves are a pure material and that the impurities which are present are caused by the inability of commercial separation equipment to completely drain the associated liquid from the solid crystals, said liquid containing substantial portions of components other than paraxylene which tend to adulterate the desired product. In order to render the product into a commercially acceptable material, the adulterating material must be substantially or nearly completely removed, wherein the value of the product becomes increasingly enhanced as the adulterating components are successively and more completely eliminated. Various methods of accomplishing this result are described hereinafter. In a first method, the crude crystal phase recovered from a primary separation zone is heated in order to effect a partial melting of the crude paraxylene crystal mass. The melted crystals have the effect of enriching the liquid that had adhered to the original crop of separated crystals such that when the heated slurry is again subjected to a separation procedure, the reduced amount of crystals which are so separated contain not only less proportion of adhering liquid because of a warmer temperature of separation, but the adhering liquid itself now contains a smaller proportion of undesirable adulterant because of the prior enrichment. This principle of partial melting and reseparation of a mass of crude crystals therefore provides a means of enhancing its value by causing an effective removal of undesirable adulterating material.

A second method of accomplishing this result is to completely melt a mass of crude solid crystal phase, and to then cool the melt again until the desired amount of recrystallization has taken place. A third method is the addition of a new solvent. Each of these methods involve the creation of a proper proportion of solid to liquid and of concentration of solid in that liquid, but it must be understood that any means of accomplishing this result is within the contemplation of the present invention.

In carrying out such crystallization processes, it is apparent that side-streams of liquid materials containing valuable components in concentrations too high to discard are encountered. These side-streams must be recycled back into the process in an integrated fashion, and the degree of partial melting and the number of melting stages constitute an essential part of the subject invention. Indeed, it has been found that unless the degree of partial melting and the proper disposition of particular recycle streams is carefully regulated and controlled that certain of these recycle streams will become infinite in character and amount, thereby rendering any integrated process inoperable. Thus, it has been found that the predominantly paraxylene solid phase recovered from each separation zone of the present process must have a concentration of components other than paraxylene of from 50 to 98%, and preferably from 65 to 85% less than the concentration of said components present in the solid crystal phase recovered from the preceding separation zone. This result can be effected by adjusting the temperature of the slurry feed to each separation zone. Of course, the actual temperature of each slurry feed depends upon the number of separation zones or stages employed, the paraxylene purity of the final product, and the efficiency of the separation zone equipment itself. For paraxylene purities in excess of 95%, the terminal separation zone feed must be separated at a temperature in the range of from about 0° F. to 55° F.

The xylene-containing feed stock of the present invention may be any hydrocarbon mixture consisting predominantly of xylene isomers and having a paraxylene content greater than that necessary to form a eutectic mixture with the other xylene isomers in the feed. Coke oven distillates having xylene contents of 75% or higher are suitable feeds. Xylene-rich fractions separated from catalytically reformed naphtha are also suitable.

From the petroleum industry, straight-run naphthenic distillates boiling in the range from about 180° F. to 340° F. are reformed over various catalysts at comparatively high temperatures in the presence of hydrogen to increase the aromatic content of the distillates. The product of such a process can be fractionally distilled to separate a fraction boiling in the range of about 275° F. to 300° F. and having a $C_8$ aromatic content of 50 to 60% which is particularly suited as a feed to the present process.

More preferably, the feed stocks of the present invention are those xylene-containing hydrocarbon fractions that have been solvent extracted, as by $SO_2$, aqueous glycol solutions and the like, to produce a feed stock having a $C_8$ aromatic content of 95% and above. Xylene-rich fractions obtained by such solvent extraction methods commonly contain 10 to 15% ethylbenzene, 20 to 25% orthoxylene, 40 to 50% metaxylene, 20 to 25% paraxylene, and less than 5% of paraffinic and naphthenic hydrocarbons boiling in the same approximate range as that of the xylenes.

A preferred method of operating the subject process is one wherein any orthoxylene present in the initial feed is first removed by fractional distillation. Thus, it is preferred that the feed stocks be first passed into an orthoxylene stripping column wherein orthoxylene is removed from said stocks by an efficient fractional distillation separation. This separation is a difficult one in that the boiling points of the xylene isomers are quite close. However, by first passing the feed stock into a column wherein the number of theoretical plates is an excess of about 35, and preferably on the order of 60 or more, orthoxylene can be removed as a bottoms product in relatively high purity.

The following description, taken in conjunction with the accompanying figure, is an exemplification of the present process. The drawing is schematic and it is obvious that many pumps, exchangers, and the like have been omitted for simplicity and can be readily supplied by one skilled in the art.

A hydrocarbon feed stock obtained from a catalytically reformed naphtha, amounting to 13,430 lbs./hr. and having a paraxylene content of 22 weight percent, is passed, via line 10, into drier 11 wherein any entrained water present in the feed is removed. The waterless feed is removed from drier 11 by line 13 and passed to cooling zone 14. 49 lbs./hr. of methanol is passed by line 12 into line 13. The methanol is employed to reduce water ice plugging during separation operations described hereinafter. The use of methanol for such a purpose is described in U.S. Patent 2,659,763 to Humphries et al.

In cooling zone 14, the hydrocarbon-methanol feed, via line 13, is cooled to a temperature in the range of from about —75° F. to —120° F. In the present example, cooling is conducted until the temperature reaches approximately —95° F. Cooling zone 14 can be comprised of any conventional means or equipment for cooling a stream, but it is preferred that the zone comprise a vessel, such as a crystallizer, that is, either directly cooled, as by the addition of $CO_2$ to the feed, or by indirect methods such as by heat exchangers and the like. In any case, the cooling operation is preferably conducted at a comparatively slow rate, with a residence time in the cooling zone generally on the order of about 20 minutes or so.

By cooling to a temperature of —95° F., a first slurry comprising a first solid crystal phase of paraxylene in a first liquid phase is formed in cooler 14. If desired, a portion of this slurry may be recycled by line 15 to line 13. From cooler 14, by line 16, is passed 14,559 lbs. of hydrocarbon per hour in the form of a first slurry into a primary separation zone 17. In the present case, separation zone 17 comprises a conventional centrifuge, but it must be understood that any means of separating the solid crystalline phase contained in the slurry from the liquid is within the contemplation of the present invention.

The separation in primary separation zone 17 is conducted at —95° F., well within the —75° F. to —120° F. range. A first liquid phase is recovered from separation zone 17 by line 18 and is passed from the system as a product. In the subject example, 11,439 lbs./hr. of hydrocarbon, having a paraxylene content of 8.3 weight percent, is removed in this manner. The first solid phase recovered in separator 17, amounting to 3,120 lbs./hr., and having a paraxylene content of about 74% by weight, is passed by line 19 into reslurry tank 20 wherein it is contacted with 8,320 lbs./hr. of a first recycle stream hereinafter described, entering reslurry tank 20 by line 21. In reslurry tank 20, the first solid crystal phase separated in separator 17 is admixed with the recycle stream entering the tank by line 21 and a further recycle stream 33 to form a second slurry within said tank 20. This second slurry is then passed by line 22 into cooler or cooling zone 23 wherein the temperature of the second slurry is adjusted, either by direct or indirect heat exchange, to a temperature in the range of from about 0° F. to —30° F. In the present example, the second slurry entering cooling zone 23 by line 22 amounts to 12,190 lbs. of hydrocarbon per hour, having a paraxylene content of about 42 weight percent. In this example, the temperature of the second slurry is adjusted in cooler 23 to —30° F. The second slurry is thereafter passed from cooler 23 by line 24 into intermediate separation zone 25 wherein a first intermediate solid crystal phase is recovered by line 26, and a first intermediate liquid phase is recovered by line 21. The first intermediate liquid phase recovered from separation zone 25 by line 21 is, in part, the aforementioned recycle stream that enters reslurry tank 20 by line 21. The total liquid phase recovered from separator 25 amounts to 9,400 lbs./hr. of hydrocarbon having a 27% paraxylene content, of which 8,320 lbs./hr. are recycled by line 21 to reslurry tank 20. The remainder of the first intermediate liquid phase, amounting to 1,080 lbs./hr. is either removed from the system by line 27 or, as in the present example, passed into line 13.

The first intermediate solid phase recovered in separation zone 25, having a 91% paraxylene content, is passed by line 26 into a second reslurry tank 28 wherein it is contacted with a recycle stream entering reslurry tank 28 by line 29. The contact between the solid phase entering by line 26 and the liquid recycle stream entering by line 29 forms a final slurry, having a paraxylene content of about 76% and amounting to 9,690 lbs./hr., and is passed by line 30 into terminal separation zone 31. The temperature of this final slurry is adjusted by direct or indirect heat exchange to a temperature in the range of from about 0° F. to 55° F., and preferably in the range of from about 10° F. to 45° F. In separation zone 31, a final solid phase is recovered by line 32 and a final liquid phase is recovered by line 29. A portion of the final liquid phase is returned as recycle by line 29 to a reslurry tank 28, amounting to 6,900 lbs./hr. of a hydrocarbon stream having a paraxylene content of 70%; the remaining portion, amounting to 750 lbs./hr., is either removed from the system, or, as in the present example, is passed into reslurry tank 20 by line 33. The final solid crystal phase, recovered from separation zone 31 and amounting to 2,040 lbs./hr. of hydrocarbons having a 98.5% paraxylene content, is passed into melt tank 34 wherein it is heated into a liquid phase and removed as a product by line 35. The final product therefore has a purity of 98.5% paraxylene and amounts to 67.5% of the paraxylene present in the initial feed.

In the example just cited, the final recovered product has a concentration of components other than paraxylene of 1.5%. If this were a fiftieth of the concentration of impurities contained in the solid phase from the preceding separation zone, then said solid phase would be 25% paraxylene. Since it is obvious that a 25% paraxylene stream cannot be separated into two new streams, each of higher paraxylene concentration, then it now becomes apparent that the reduction in concentration in adulterating material must be less than fifty fold between the solid phases leaving any two adjacent separation zones.

Similarly, the solid phase from the intermediate separation zone contains 9% adulterants, and it is even more obvious that this must be less than a fifty fold reduction of concentration of adulterants in the solid phase obtained from the primary separation stage.

As previously noted, the above described process is the simplest form within the scope of the present invention, i.e., there is only one intermediate separation stage and $n$ is equal to 1. The actual introduction in the process described of one, two or three more intermediate stages is apparent. Thus, a second intermediate separation stage would be inserted in the process flow shown in the accompanying figure as follows.

The first intermediate solid phase recovered by line 26 from the first intermediate separation zone 25 would be passed into a reslurry tank (not shown) where it would be contacted with a recycle stream to form a second intermediate slurry. The temperature of this slurry would be adjusted to a temperature in the range of from about −30° F. to −55° F. by direct or indirect heat exchange and then passed into a second intermediate separation zone from which would be recovered a second intermediate solid crystal phase and a second intermediate liquid phase. The former phase would then be passed by line 26 into reslurry tank 28 and further treated in the manner hereinbefore described. At least a portion of the recovered second intermediate liquid phase would be passed as the recycle stream to reslurry the first intermediate solid crystal phase recovered from the first intermediate separation zone 25. Other intermediate separation stages could be added in the same manner.

By successive continuation of such multistage xylene separation, it is apparent that the final product may be brought to any degree of purity desired. To accomplish this effect on a continuous basis and with proper regard for control of the process and proper integration of resultant recycle streams, it becomes apparent that the amount of purification to be gained between any two successive separation stages must be held within certain well defined limits in order to provide an operable process.

Although the present invention is directed to a multistage process for the recovery of high purity paraxylene from hydrocarbon fractions containing paraxylene and at least one other xylene isomer, it must be understood that this fractional crystallization process is applicable to the recovery and purification of any crystallizable organic compound from mixtures containing such compounds. For example, metaxylene, durene, pseudo-cumene, to name only a few, can be recovered from diverse mixtures containing them by the basic process described herein. This can be done by adjusting feed temperatures to each separation zone such that the solid crystal phase recovered from each of a plurality of separation zones has a concentration of components, other than the compound to be crystallized and recovered, of from 50 to 98% less than the concentration of said components present in the solid crystal phase recovered from the preceding separation zone.

I claim:

1. A process for recovering high yields of paraxylene having a purity in excess of 95% from a hydrocarbon fraction comprising paraxylene and at least one other xylene isomer which comprises cooling said fraction to a temperature in the range of from about −75° F. to −120° F. for a time sufficient to cause the formation of a first slurry comprising a first solid crystal phase and a first liquid phase, separating said phases in a primary separation zone, recovering said first liquid phase, passing said first solid crystal phase and a first recycle stream in concurrent contact as a second slurry to an intermediate separation zone, adjusting the temperature of said second slurry to a temperature in the range of from about 0° F. to −30° F. to thereby warm the outer layers of paraxylene crystals in said second slurry and facilitate enrichment of the adhering liquid layers in paraxylene, separating said second slurry in said intermediate separation zone to recover a second solid crystal phase and a second liquid phase, passing at least a portion of said second liquid phase as said first recycle stream to contact said first solid crystal phase recovered from said primary separation zone, passing said second crystal phase and a second recycle stream in concurrent contact as a final slurry to a terminal separation zone, adjusting the temperature of said final slurry to a temperature in the range of from about 10° F. to 45° F. to thereby warm the outer layers of paraxylene crystals in said final slurry and facilitate enrichment of the adhering liquid layers in paraxylene, separating said final slurry in said terminal separation zone to recover a final solid crystal phase product having a paraxylene purity in excess of 95% and a final liquid phase, and passing at least a portion of said final liquid phase as said second recycle stream to contact said second solid crystal phase recovered from said intermediate separation zone.

2. A process for recovering high yields of paraxylene having a purity in excess of 95 percent from a hydrocarbon fraction comprising paraxylene and at least one other xylene isomer which comprises cooling said fraction to a temperature in the range of from about −75° F. to −120° F. for a time sufficient to cause the formation of a first slurry, passing said first slurry into a primary separation zone and recovering therefrom a predominantly paraxylene first solid crystal phase and a first liquid phase, passing said solid crystal phase and a portion of the liquid recovered from a first intermediate separation zone as a first recycle stream, in concurrent flow as a second slurry into the first of $n$ successive intermediate separation zones, wherein $n$ is an integer from 1–10 and wherein the slurry fed to each of the individual intermediate separation zones comprises the solid phase recovered from the preceding separation zone and a portion of the liquid phase recovered and recycled from the next succeeding separation zone; adjusting the temperature of each succeeding slurry to a temperature higher than that of the immediately preceding slurry, passing to a terminal separation zone the crystal phase obtained from the last intermediate separation zone together with a portion of the final liquid phase obtained from said terminal separation zone, as hereinafter described, as a final separate slurry and adjusting the temperature of the said final separate slurry to about 0° F. to +55° F., and recovering from the terminal separation zone a final crystal phase product having a paraxylene purity in excess of 95 percent, and a final liquid phase; and passing at least a portion of said final liquid phase as the last recycle stream to contact the solid crystal phase recovered from the last intermediate separation zone to form said final separate slurry.

3. The process of claim 2 wherein the temperature of the slurry feed to each intermediate separation zone is adjusted such that the solid crystal phase recovered from each intermediate separation zone has a concentration of components other than paraxylene of from 50 to 98% less than the concentration of said components present in the solid crystal phase recovered from the preceding separation zone.

References Cited in the file of this patent

UNITED STATES PATENTS

| | | |
|---|---|---|
| 2,540,977 | Arnold | Feb. 6, 1951 |
| 2,688,045 | Powers | Aug. 31, 1954 |
| 2,750,433 | LeTourneau et al. | June 12, 1956 |
| 2,815,364 | Green | Dec. 3, 1957 |
| 2,848,519 | Corneil et al. | Aug. 19, 1958 |
| 2,866,833 | Spiller | Dec. 30, 1958 |

FOREIGN PATENTS

| | | |
|---|---|---|
| 534,832 | Canada | Dec. 25, 1956 |